A. M. SOSA.
REVERSING MECHANISM FOR MACHINE TOOLS.
APPLICATION FILED JULY 8, 1914.
1,171,003.
Patented Feb. 8, 1916.
2 SHEETS—SHEET 1.
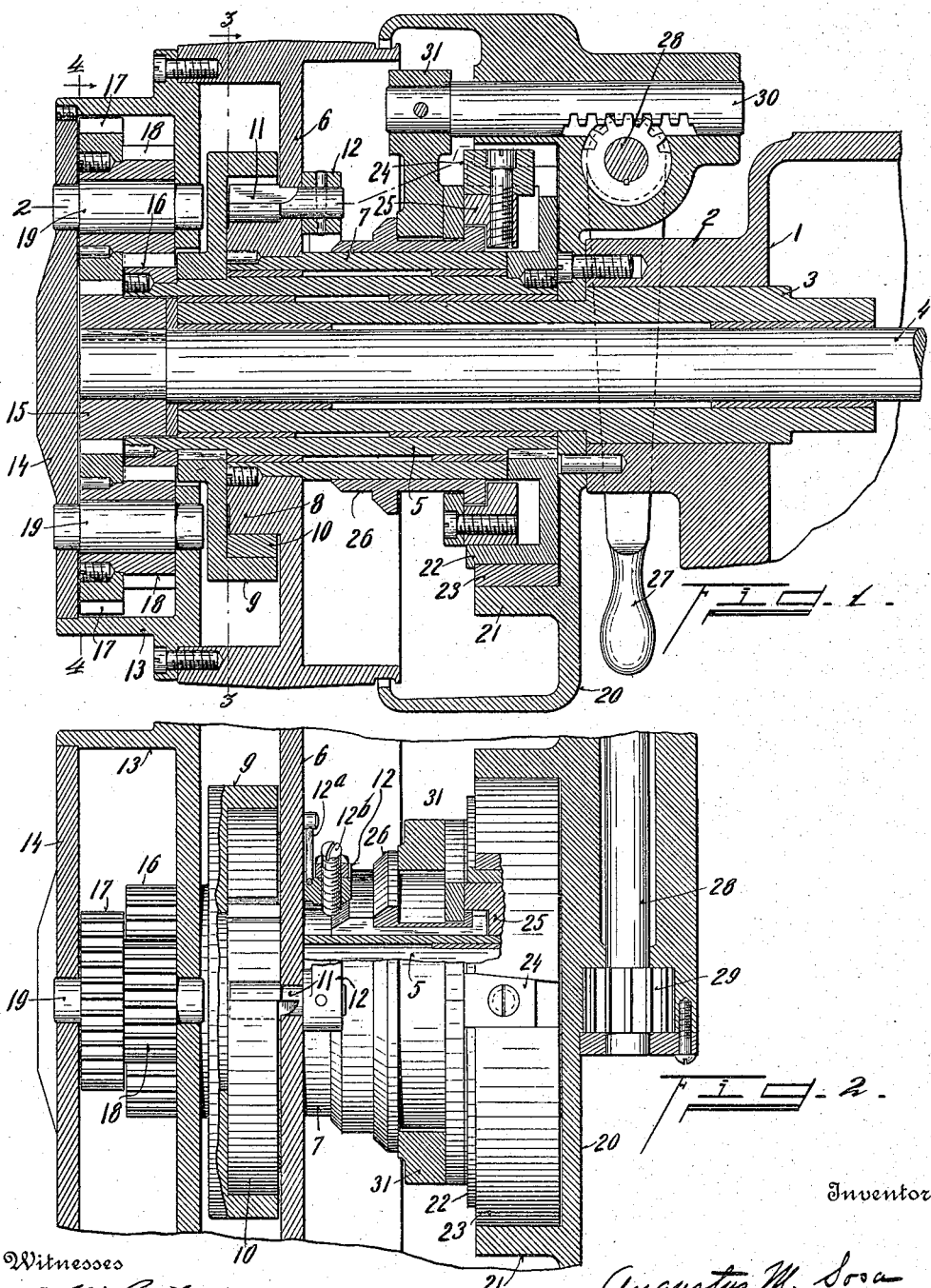

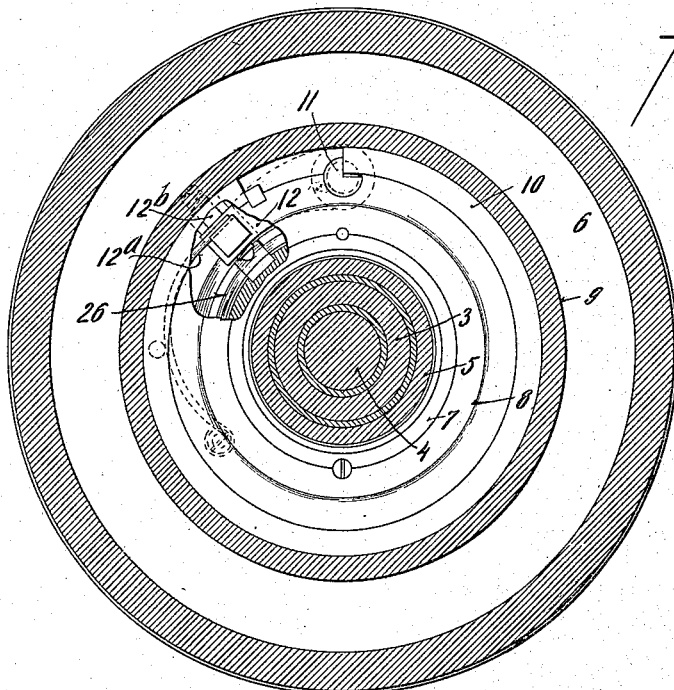
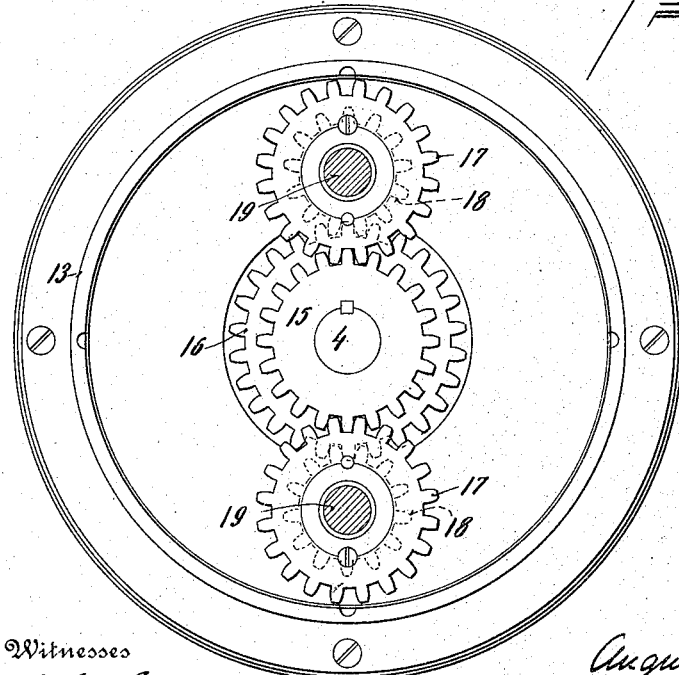

UNITED STATES PATENT OFFICE.

AUGUSTUS M. SOSA, OF CINCINNATI, OHIO, ASSIGNOR TO THE AMERICAN TOOL WORKS COMPANY, OF CINCINNATI, OHIO, A CORPORATION OF OHIO.

REVERSING MECHANISM FOR MACHINE-TOOLS.

1,171,003.  Specification of Letters Patent. Patented Feb. 8, 1916.

Application filed July 8, 1914. Serial No. 849,659.

*To all whom it may concern:*

Be it known that I, AUGUSTUS M. SOSA, a citizen of the United States, and residing at Cincinnati, in the county of Hamilton and State of Ohio, have invented a new and useful Improvement in Reversing Mechanism for Machine-Tools, of which the following specification is a full disclosure.

My invention relates to transmission mechanism, primarily the main drive for a machine tool for imparting either a forward or reverse rotation with the reverse rotation preferably at a higher rate of speed.

An object of my invention is to provide compact and unitary devices as the primary transmission for a machine tool in which the direction of rotation can be readily and conveniently, selectively and alternately changed, under the control of a single hand lever, and at a relatively different speed, for preferably imparting a forward or higher speed reverse direction of rotation.

Another object of my invention relates to the concentric arrangement of driving pulley, driven shaft and intermediate differential power transmitting elements, qualifying in one instance as unitary coupling means independently non-rotative and housed within the compass of the periphery of the pulley for imparting rotation to said driving shaft in one direction, and convertible through clutching devices to independently rotating the elements for imparting a reverse direction of rotation to said driving shaft and preferably at a higher rate of speed than the opposite rotation of the pulley.

Another object of my invention is to provide a reversing transmission device, comprised in a pulley or rotating member, of a constant speed as a driving member, a shaft as a driven member, with differential and planetary gears in train and capable of being connected as intermediates with said pulley and shaft for imparting a higher speeded reverse rotation to said shaft, and also qualifying as coupling devices for unitarily combining said pulley and shaft for a corresponding rotation.

Other objects and features of my invention will be more fully revealed from the annexed drawings, and the following description thereof disclosing a preferred embodiment of the invention which also comprises details of construction for providing a self-contained power transmitting device and reverse at a higher rate of speed, in compact and neatly housed structure, and in such drawings like characters of reference denote corresponding parts throughout the several views, of which:—

Figure 1 is a central vertical section. Fig. 2 is a mutilated plan view on line 2—2, Fig. 1. Fig. 3 is a section on line 3—3, Fig. 1, with the web of the pulley broken away to more clearly illustrate the spliting actuating finger. Fig. 4 is a section on line 4—4, Fig. 1.

The device as illustrated is utilized primarily conjunctively with a machine tool as a transmission for imparting either forward or reverse rotation and preferably with the reverse at a higher rate of speed. This, however, is a geometrical result derived from the ratio of gearing employed in the device which may be variously modified according to its requirements.

The device is readily applicable to the various classes of machine tools and is comprised in a self-contained organization wherein the clutching and differential mechanisms are all compactly housed.

In the drawings, 1 indicates a portion of the frame of a machine tool upon which the transmission device is applied. It is provided with an extended bearing hub 2, having an elongated bushing 3 concentrically fixed within its bore non-rotative and projected beyond the hub to form a tubular bearing upon which the transmission elements are supported and within which the driving shaft 4 of the machine tool is concentrically journaled. Suitable bearing bushings are employed between the shaft and bearing 3 as an expedient of good mechanical practice. A sleeve 5 is concentrically rotatively mounted upon the tubular bearing 3 and provides a connector between the differentials and clutching mechanism, which latter alternately connects the sleeve with the driving pulley or arrests its rotation.

A pulley 6 is concentrically mounted upon the sleeve 5 and has an elongated hub 7 extended from one side upon which the clutch elements are slidable concentrically. The hub 7 is illustrated as a tubular member fitting into the pulley and fixed thereto as a facility in the manufacture, but it may form an integral part of the pulley. The pulley normally is coupled to the sleeve 5, that is, when a forward rotation is imparted to shaft 4 and free thereon for reverse rotation of said shaft. The coupling means for connecting the pulley to the sleeve 5 may be of any well known design, which is conveniently and quickly operated, and in this instance preferably comprises a friction clutch of the following components. The pulley 6 has an annular hub extension 8 projected into an annular cup-shaped friction member 9 concentrically fixed or keyed upon the sleeve 5 to interveningly receive the split friction clamping ring 10. A wedge pin 11, rotatively journaled in said pulley hub and web, engages between the split ends of the ring to expand the same to clamp the pulley to said friction member 9 and connecting sleeve 5. The pin 11 projects beyond the web of the pulley and has a finger 12 fixed thereon for rocking it to clamp and release the ring from the friction member 9. The finger 12 is yieldingly urged toward the axis of the pulley by a spring 12$^a$ which engages its outer end and is secured to the web of the pulley. The outer end of the finger 12 is also provided with a screw 12$^b$ which provides a micrometer adjustment of the finger movement.

The system of differential or planetary gears as a unit are arranged to rotate with the pulley 6 and the shaft 4 for the forward rotation of the shaft 4 and do not qualify then as gears, but merely as connecting means in position to immediately operate for a reverse rotation by respectively being in constant intermesh. In the forward rotation they are locked against relative rotary movement. The pulley 6 at one side has a casing member 13 fixed thereto and unitarily rotating therewith. The casing has a cover plate 14 providing a closure therefor, and also serves as a bearing for the planetary gears within the casing 13. The shaft 4 has a gear 15 fixed thereon and within the casing 13, and the connector sleeve 5 has one of its ends projected into said casing 13, with a gear 16 fixed thereon adjacent the gear 15. These gears 15 and 16 are intermeshed respectively with the planetary compound gears herein illustrated in duplicate, in which the gear 17 as a member of said compound gearing, intermeshes with gear 15, while gear 18 as a second member intermeshes with the gear 16 upon the connector sleeve 5. The compound gear is loosely journaled within the casing and mounted upon a shaft 19, its ends supported within the casing and closure plate, as shown in Fig. 1, and comprise elements of the planetary gears which are arranged in plural number or sets to be herein illustrated, in fact, the number may be varied to meet the desires of the users. Thus it will be observed that as the gear 16, through the connector sleeve 5 and coupling means, is capable of being secured as a unit to the pulley 6 to rotate in the same direction therewith, it serves as a lock against planetary gear rotation which, by reason of their connection with the casing 13, which likewise is connected to the pulley 6, rotate about the axis of shaft 4, combined all the elements described, namely, shaft 4, gears 15 and 16 with their intermeshing planetary gears 17 and 18 with the pulley 6, so as to revolve about a common axis, and are thus utilized for driving the shaft 4 in the same direction as that of the pulley 6 referred to herein as the forward direction.

For reversely rotating the shaft 4, the function of the planetary gears is brought into operation in which they rotate about their own axis as well as a common axis, and which is accomplished by locking gear 16 against rotation so that it qualifies as a rack with the planetary gears revolving around said gear 16, producing independent rotation thereof, which is distributed to the gear 15 rotating the same and its shaft 4 in a direction reverse to that of pulley 6.

The gear 16 is locked against rotation by the following mechanism: A casing 20 is rigidly secured to the machine frame 1, at one side of the pulley 6, opposite the casing 13. This casing interiorly has an annular flange-like extension 21, providing a friction guiding surface for friction clutch mechanism. A drum 22 fixed to the connector sleeve 5 forms a second clamping member for the friction clutch device, fitting within the recess formed by the annular flange 21, to form an opposing friction surface upon the periphery of said member 22. A clamping split ring 23 is interposed between said annular surface, adapted to be expanded by a web block 24, secured to an annulus 25 loosely and concentrically mounted upon a thimble 26, concentrically slidable upon the hub extension 7 of the pulley, which thimble provides actuator means for rocking the finger 12 and shifting the web 24 alternately. The annulus 25 is made of two parts to facilitate its manufacture, with one member provided with an annular offset, which, together with the second member of the annulus forms a circumferential groove for retainingly, rotatively connecting the annulus to the sliding thimble 26, the thimble 26 having an annular flange radiating therefrom and projecting into said circumferential groove of the annulus 25. The opposite end of the thimble is inclined, so as to readily pass beneath the finger and rock the same as the thimble is shifted to the left for expanding the split-ring 10, for functioning said first described clutch mechanism which unitarily combines the gear with the pulley 6. When the second clutch devices are brought into commission they will lock the connector sleeve 5 against rotation, it being noted that the clutching devices clamp to the frame 20, which is non-rotative, and, therefore, securely hold gear 16 against rotation for producing the reverse drive to shaft 4. In such instance the first clutch mechanism is released, which releases the connector sleeve 5 from the pulley 6, with the pulley revolving loosely upon said sleeve. The planetary gears being connected to revolve about the axis of the pulley 6 also revolving about their own axes when gear 16 is non-rotative, in the same direction as that of pulley 6, transmitting a reverse direction to gear 15, fixed on shaft 4. The speed, of course, being dependent upon the gear ratio employed, and, therefore, may be at the same or at a higher or lower rate of speed than that of pulley 6, but in the preferred use it is desirable that the reverse rotation of shaft 4 be at a higher rate of speed than that of pulley 6.

As shown, the thimble 26 alternately operates two opposing friction clutch devices, which arbitrarily prevents simultaneous functioning of the two different clutch devices, and, therefore, in a measure qualifies as safety means, and also simplifies the construction to enable it to be operated by a single hand lever. The clutch thimble 26 is slid from one position to a second or to an intermediate neutral position by hand lever 27, fixed to a shaft 28 journaled and supported within the frame 20. The shaft 28 has a gear segment 29 fixed thereto, its teeth intermeshed with a rack bar 30 slidably mounted within the casing 20 and transversely to said shaft. The rack-bar 30 has a yoke arm 31 fixed thereto and engaged into a circumferential groove formed in the periphery of the clutch thimble 26. Thus moving the hand lever 27 to either the right or left will accordingly shift the clutch 26 in a direction to operate a selected clutching device for either forwardly or reversely rotating the shaft 4. When the shifting mechanism for the clutches assumes the position, as shown in Fig. 1, recognized as a neutral position, no motion is transmitted to the shaft 4, because the planetary gears merely revolve around gear 15 and rotate the gear 16 in a reverse direction.

The pulley 6 in the operation of the device revolves constantly in one direction, and, as has been explained, no motion is imparted to shaft 4 with the clutch thimble in its neutral position. Now, assuming that the thimble 26 has been moved to the left, or toward the pulley 6, this will rock the finger 12 to expand the split or friction ring 10 clamping the pulley to the connector sleeve 5, rotating its gear 16, as a unit with the pulley. The planetary gears moving about the common axis of the pulley 6 and sleeve 5, by reason of their supporting casing rigid connection with the pulley, move in an orbit at the same speed and direction as that of the pulley and gear 16, receive no motion and serve to bind all the gears together as a unit. The relationship between shaft 4 and pulley 6 are the equivalent of being in direct connection, and, therefore, revolve as a unit in the same direction and speed, and herein referred to as the forward drive. Now, further assuming that the clutch thimble is moved to the extreme right, or to an alternate position from that above assumed, which releases the first clutching devices and brings the second clutching devices into commission, which locks the connector sleeve to the stationary frame 20, or to the machine frame, gear 16 is then qualified as a circumferential rack around which the planetary gear revolves with the pulley 6 and also rotates them upon the individual axis transmitting rotative motion to gear 15 and shaft 4. The direction of rotation and speed of shaft 4, however, depends upon the gear ratio employed. As an example, assume that gear 15 makes one-half of a revolution backward, while pulley 6 makes one revolution forward, the shaft 4 will thus make one-half revolution forward. Now, again, arrange gearing so that the rotating pulley and gear 15 is equalized, each coördinately making a revolution relatively in opposing directions and with no difference in speed, the shaft 4 will remain stationary. Now reverse the conditions as to speed, assume that gear 15 is caused to rotate two revolutions backward to one forward of pulley 6. This will obtain a resulting difference of one revolution backward for shaft 4, and it is primarily to such a combination to which my invention is directed in a broad aspect, namely to rotate the shaft 4 at a higher reverse speed than the forward speed of the pulley 6. During the forward drive of shaft 4, the gears have no rotation and are therefore relieved of any wear, but in constant intermesh and operative without jar in the reverse drive of the shaft 4. Its structure has mechanical advantages in that the gearing clutching devices are completely bound and the whole a unitary combination readily adapted to a machine tool. As a further advantage it is to be noted that the drive pulley and the sleeve 5 are journaled on the fixed tubular support and have no bearing on the shaft 4. This relieves the shaft of all transverse strains due to the tension and driving pull of the driving belt, thereby providing a free running shaft and reducing the wear of the shaft bearings to a minimum.

Having described my invention, I claim:—

1. A device of the nature disclosed combining a tubular non-rotative supporting member, a shaft passing freely through said member, a pulley supported upon said member, a system of planetary gears unitarily rotative with said pulley and operatively connected with said shaft, and a gear member available as lock member for unitarily uniting the rotative members and adapted to be non-rotatively retained for rotating said planetary gears upon their axis to rotate said shaft reversely.

2. A device of the nature disclosed combining a non-rotative supporting member, a shaft passing concentrically freely through said member, a tubular member concentrically supported upon said supporting member, a pulley concentrically supported upon said tubular member, a pair of planetary gears unitarily revoluble with said pulley and in transmitting train with said shaft and tubular member, and means for operatively connecting said tubular member with said pulley and conversely for non-rotatively locking the same, whereby said shaft may be selectively driven by said pulley in forward and reverse directions.

3. A device of the nature disclosed combining a non-rotative supporting member, a pulley thereon, a driven shaft adapted to receive motion from said pulley, compound planetary gear supported upon said pulley in transmission train with said shaft, an intermediate gear in train with said planetary gears clutching devices for operatively connecting said intermediate gear to said pulley for uniting said pulley, gears and shafts as a revoluble unit, and conversely for non-rotatively locking said intermediate gear for independently functioning said gear for rotating said shaft in a direction reversably from that of said pulley.

4. A device of the nature disclosed combining a casing having a rigid tubular bearing element projected therefrom, a driven shaft passing freely through said casing bearing element, a pulley journaled on said bearing element and providing a closure for said casing, a compound planetary gear journaled within one side of said pulley, a gear fixed to said shaft in train with said compound planetary gear, a gear member coaxial with said pulley in train with said compound planetary gear, a clutch device within said casing and pulley closure for connecting said gear member to said pulley, a second clutch device within said casing and pulley closure for uniting said gear member and casing non-rotatively locking said gear member, and a single lever controlled clutch actuator mechanism for said clutching devices adapted to alternatively function the same, for unitarily revolubly uniting said rotative members, and secondly for independently functioning said gear for rotating said pulley and shaft in relatively opposing directions.

5. A device of the nature disclosed combining a rigid support, a pulley journaled thereon, a shaft, a gear fixed on the shaft, a gear member coaxial relatively and concentrically mounted on said support, unitarily united different diameter planetary gears unitarily revoluble with said pulley and in respective gear train engagement with said shaft gear and gear member, and means for locking said gear member to said pulley, non-rotatingly uniting said gears for a corresponding rotation of the pulley and shaft, and alternately conversely for non-rotatively locking said gear member to the support for rotating said planetary gears upon their own axis, for driving said shaft in a direction reversely from that of said pulley and at a relatively higher rate of speed.

6. A device of the nature disclosed combining a non-rotative supporting member and providing a casing and friction clutch element, a shaft passing concentrically freely through said member, a tubular member concentrically supported upon said supporting member, a pulley concentrically supported upon said tubular member, providing a closure for said supporting member casing and a friction clutch element, a pair of planetary gears unitarily revoluble with said pulley and in transmitting train with said shaft and tubular member, friction clutch elements rigid with said tubular member respectively coöperative with said casing and pulley clutch elements, and means for frictionally uniting said respective coöperating clutch elements alternately, whereby said shaft may be selectively rotated by the pulley in corresponding and conversely in relatively opposite directions.

7. A device of the nature disclosed combining a rigid overhanging support, a driven shaft passing freely through said support, a first gear fixed to the free end of the shaft, a second gear journaled on the support, a drive pulley journaled on the hub of the second gear, planetary gears journaled on the pulley intermediate the first and second gears, means for alternately rotatively connecting the second gear and pulley and non-rotatively connecting the second gear and rigid support.

In witness whereof I hereunto subscribe my name, as attested by the two subscribing witnesses.

AUGUSTUS M. SOSA.

Witnesses:
EMMA SPENER,
L. A. BECK.